(12) United States Patent
Myers

(10) Patent No.: US 10,978,100 B1
(45) Date of Patent: Apr. 13, 2021

(54) BELT-DRIVEN ROTARY CAM ELEVATOR MECHANISM FOR REDUCED-HEAD DATA STORAGE DEVICE

(71) Applicant: Western Digital Technologies, Inc., San Jose, CA (US)

(72) Inventor: David K. Myers, Campbell, CA (US)

(73) Assignee: Western Digital Technologies, Inc., San Jose, CA (US)

(*) Notice: Subject to any disclaimer, the term of this patent is extended or adjusted under 35 U.S.C. 154(b) by 0 days.

(21) Appl. No.: 16/933,802

(22) Filed: Jul. 20, 2020

Related U.S. Application Data

(63) Continuation-in-part of application No. 16/513,585, filed on Jul. 16, 2019.

(60) Provisional application No. 62/700,777, filed on Jul. 19, 2018, provisional application No. 62/700,780, filed on Jul. 19, 2018, provisional application No. 62/702,163, filed on Jul. 23, 2018, provisional application No. 62/702,154, filed on Jul. 23, 2018, provisional application No. 62/747,623, filed on Oct. 18, 2018, provisional application No. 62/878,306, filed on Jul. 24, 2019.

(51) Int. Cl.
*G11B 5/48* (2006.01)
*G11B 33/12* (2006.01)

(52) U.S. Cl.
CPC .......... *G11B 5/4826* (2013.01); *G11B 5/4813* (2013.01); *G11B 33/121* (2013.01)

(58) Field of Classification Search
CPC .... G11B 5/4826; G11B 5/4813; G11B 33/121
USPC .............................................. 360/264–264.5
See application file for complete search history.

(56) References Cited

U.S. PATENT DOCUMENTS

| | | |
|---|---|---|
| 3,134,097 A | 5/1964 | Stevens et al. |
| 3,172,082 A | 3/1965 | Dirks |
| 3,505,060 A | 3/1970 | Goddard et al. |
| 4,566,087 A | 1/1986 | Kraft |
| 5,930,549 A | 7/1999 | Kim et al. |

(Continued)

FOREIGN PATENT DOCUMENTS

| | | |
|---|---|---|
| CN | 101083407 A | 12/2007 |
| CN | 103875163 A | 6/2014 |

(Continued)

OTHER PUBLICATIONS

International Business Machines Corporation, IBM Customer Engineering Manual of Instruction, RAMAC 305, copyright 1958, 1959 by International Business Machines Corporation, 253 pages.

(Continued)

*Primary Examiner* — Allen T Cao
(74) *Attorney, Agent, or Firm* — John D. Henkhaus

(57) ABSTRACT

An approach to a reduced-head hard disk drive involves an actuator subsystem that includes a ball screw cam assembly wherein the number of starts of a multi-start lead screw equals the number of balls riding in a corresponding start. A stepper motor may be employed to drive rotation of a pulley or gear to which a drive belt or drive chain is attached, to transmit power to the lead screw via the drive belt or chain, thereby driving rotation of the lead screw to drive translation of an actuator arm assembly along the axis of the lead screw so that a corresponding pair of read-write heads can access different magnetic-recording disks of a multiple-disk stack.

18 Claims, 12 Drawing Sheets

(56) References Cited

U.S. PATENT DOCUMENTS

| | | | |
|---|---|---|---|
| 6,005,747 | A | 12/1999 | Gilovich |
| 7,986,491 | B2 | 7/2011 | Albrecht et al. |
| 8,112,580 | B2 | 2/2012 | Bandic et al. |
| 8,208,215 | B2 | 6/2012 | Molaro et al. |
| 8,824,094 | B1 | 9/2014 | Furlong et al. |
| 8,958,172 | B1 | 2/2015 | Hansen |
| 8,958,173 | B1 | 2/2015 | Hirano et al. |
| 9,025,277 | B1 | 5/2015 | Hirano |
| 9,183,862 | B1 | 11/2015 | Shah et al. |
| 9,218,833 | B1 | 12/2015 | Shah et al. |
| 9,472,220 | B1 * | 10/2016 | Burgos ............... G11B 5/6088 |
| 9,530,445 | B1 * | 12/2016 | Grobis ............... G11B 5/7379 |
| 9,552,835 | B1 | 1/2017 | Tamayo et al. |
| 9,704,521 | B1 | 7/2017 | Shah et al. |
| 10,269,380 | B1 | 4/2019 | Sun et al. |
| 2004/0109255 | A1 | 6/2004 | Walz |
| 2008/0055773 | A1 | 3/2008 | Nigam |
| 2010/0091408 | A1 | 4/2010 | Albrecht et al. |
| 2011/0080675 | A1 | 4/2011 | Boutaghou et al. |
| 2013/0213163 | A1 | 8/2013 | Nakamura et al. |
| 2015/0070798 | A1 | 3/2015 | Shiraishi et al. |
| 2017/0108052 | A1 | 4/2017 | Littlefield et al. |
| 2019/0333533 | A1 | 10/2019 | Mendonsa et al. |
| 2020/0202891 | A1 | 6/2020 | Mendonsa et al. |

FOREIGN PATENT DOCUMENTS

| | | |
|---|---|---|
| DE | 102007046382 A1 | 4/2009 |
| EP | 1538066 A1 | 6/2005 |
| EP | 1538066 B1 | 4/2009 |
| JP | 2005-346891 A | 12/2015 |

OTHER PUBLICATIONS

International Search Report and Written Opinion for PCT/US2019/042182, dated Feb. 7, 2020, 14 pages, KIPO ISA/KR.

International Search Report and Written Opinion for PCT/US2019/042202, dated Feb. 7, 2020, 13 pages, KIPO ISA/KR.

* cited by examiner

BELT-DRIVEN ROTARY CAM ELEVATOR MECHANISM FOR REDUCED-HEAD DATA STORAGE DEVICE

CROSS-REFERENCE TO RELATED APPLICATIONS

This application is a continuation-in-part of and claims the benefit of priority to U.S. patent application Ser. No. 16/513,585, filed Jul. 16, 2019, which claims the benefit of priority to U.S. Provisional Patent Application No. 62/700,777, filed Jul. 19, 2018; to U.S. Provisional Patent Application No. 62/700,780, filed Jul. 19, 2018; to U.S. Provisional Patent Application No. 62/702,163, filed Jul. 23, 2018; to U.S. Provisional Patent Application No. 62/702,154, filed Jul. 23, 2018; and to U.S. Provisional Patent Application Ser. No. 62/747,623, filed Oct. 18, 2018; the entire content of all of which is incorporated by reference for all purposes as if fully set forth herein.

This application claims the benefit of priority to U.S. Provisional Patent Application No. 62/878,306, filed Jul. 24, 2019; the entire content of which is incorporated by reference for all purposes as if fully set forth herein.

FIELD OF EMBODIMENTS

Embodiments of the invention may relate generally to a reduced-head hard disk drive having an actuator elevator mechanism and particularly to approaches having a low-profile ball screw cam actuator elevator mechanism.

BACKGROUND

There is an increasing need for archival storage. Tape is a traditional solution for data back-up, but is very slow to access data. Current archives are increasingly "active" archives, meaning some level of continuing random read data access is required. Traditional hard disk drives (HDDs) can be used but cost may be considered undesirably high. Other approaches considered may include HDDs with extra large diameter disks and HDDs having an extra tall form factor, with both requiring large capital investment due to unique components and assembly processes, low value proposition in the context of cost savings, and barriers to adoption in the marketplace due to uniquely large form factors, for example.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which.

DESCRIPTION

Approaches to a multi-disk hard disk drive having an actuator elevator mechanism are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of an Illustrative Operating Context

Embodiments may be used in the context of a multi-disk, reduced read-write head, digital data storage device (DSD) such as a hard disk drive (HDD). Thus, in accordance with an embodiment, a plan view illustrating a conventional HDD 100 is shown in FIG. 1 to aid in describing how a conventional HDD typically operates.

Figure 1:
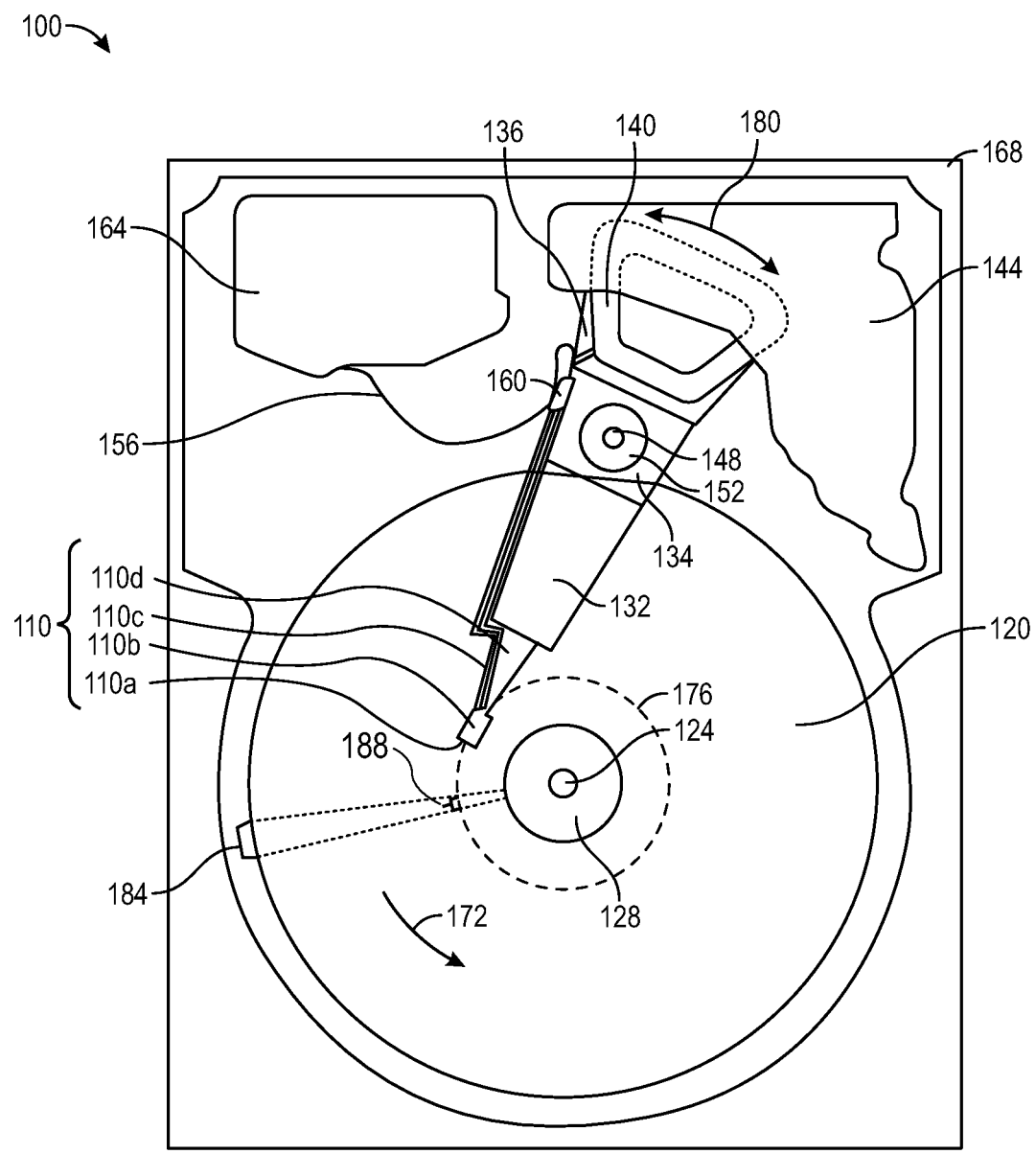
FIG. 1 is a plan view illustrating a hard disk drive, according to an embodiment.

FIG. 1 illustrates the functional arrangement of components of the HDD 100 including a slider 110*b* that includes a magnetic read-write head 110*a*. Collectively, slider 110*b* and head 110*a* may be referred to as a head slider. The HDD 100 includes at least one head gimbal assembly (HGA) 110 including the head slider, a lead suspension 110*c* attached to the head slider typically via a flexure, and a load beam 110*d* attached to the lead suspension 110*c*. The HDD 100 also includes at least one recording medium 120 rotatably mounted on a spindle 124 and a drive motor (not visible) attached to the spindle 124 for rotating the medium 120. The read-write head 110a, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are transmitted by a flexible cable assembly (FCA) 156 (or "flex cable"). Interconnection between the flex cable 156 and the head 110a may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or "baseplate" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110b rides.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110a of the HGA 110 reads the servo-burst-signal pattern, which provides a position-error-signal (PES) to the servo electronics, which controls the electrical signal provided to the voice coil 140 of the VCM, thereby enabling the head 110a to follow the track 176. Upon finding the track 176 and identifying a particular sectored track portion 188, the head 110a either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Introduction

References herein to "an embodiment", "one embodiment", and the like, are intended to mean that the particular feature, structure, or characteristic being described is included in at least one embodiment of the invention. However, instance of such phrases do not necessarily all refer to the same embodiment, The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the sidewall is vertical for all practical purposes but may not be precisely at 90 degrees.

While terms such as "optimal", "optimize", "minimal", "minimize", and the like may not have certain values associated therewith, if such terms are used herein the intent is that one of ordinary skill in the art would understand such terms to include affecting a value, parameter, metric, and the like in a beneficial direction consistent with the totality of this disclosure. For example, describing a value of something as "minimal" does not require that the value actually be equal to some theoretical minimum (e.g., zero), but should be understood in a practical sense in that a corresponding goal would be to move the value in a beneficial direction toward a theoretical minimum.

Recall that there is an increasing need for cost effective "active" archival storage (also referred to as "cold storage"), preferably having a conventional form factor and utilizing many standard components. One approach involves a standard HDD form factor (e.g., a 3.5" form factor) and largely common HDD architecture, with n disks in one rotating disk stack, but containing fewer than 2n read-write heads, according to embodiments. Such a storage device may utilize an articulation mechanism that can move the heads to mate with the different disk surfaces (for a non-limiting example, only 2 heads but 5+ disks for an air drive or 8+ disks for a He drive), where the primary cost savings may come from eliminating the vast majority of the heads in the drive.

For a cold storage data storage device, a very thin structure (e.g., the read-write head stack assembly, or "HSA") needs to be moved while keeping perpendicular to the axis on which it is moving. That structure also needs to maintain sufficient stiffness for structural and resonance control. There may be ball screws on the market that may comply with such requirements, but they are taller than the shaft they ride on and are typically considerably expensive.

With other possible approaches, there is a concern that when the actuator arms are unlocked during the time they need to be moved up and down to get to different disks, the interface between the arms and the cam rattles or is relatively loose. This could cause undesirable motion in the suspensions and heads as the arms are raised and lowered. There is also a large range of potential friction between the cam threads, arm threads, and lock nut threads that could over time cause extra wear and bad repeatability in the vertical positioning achieved.

Actuator Subsystem for Reduced-Head Hard Disk Drive

Figure 2A:
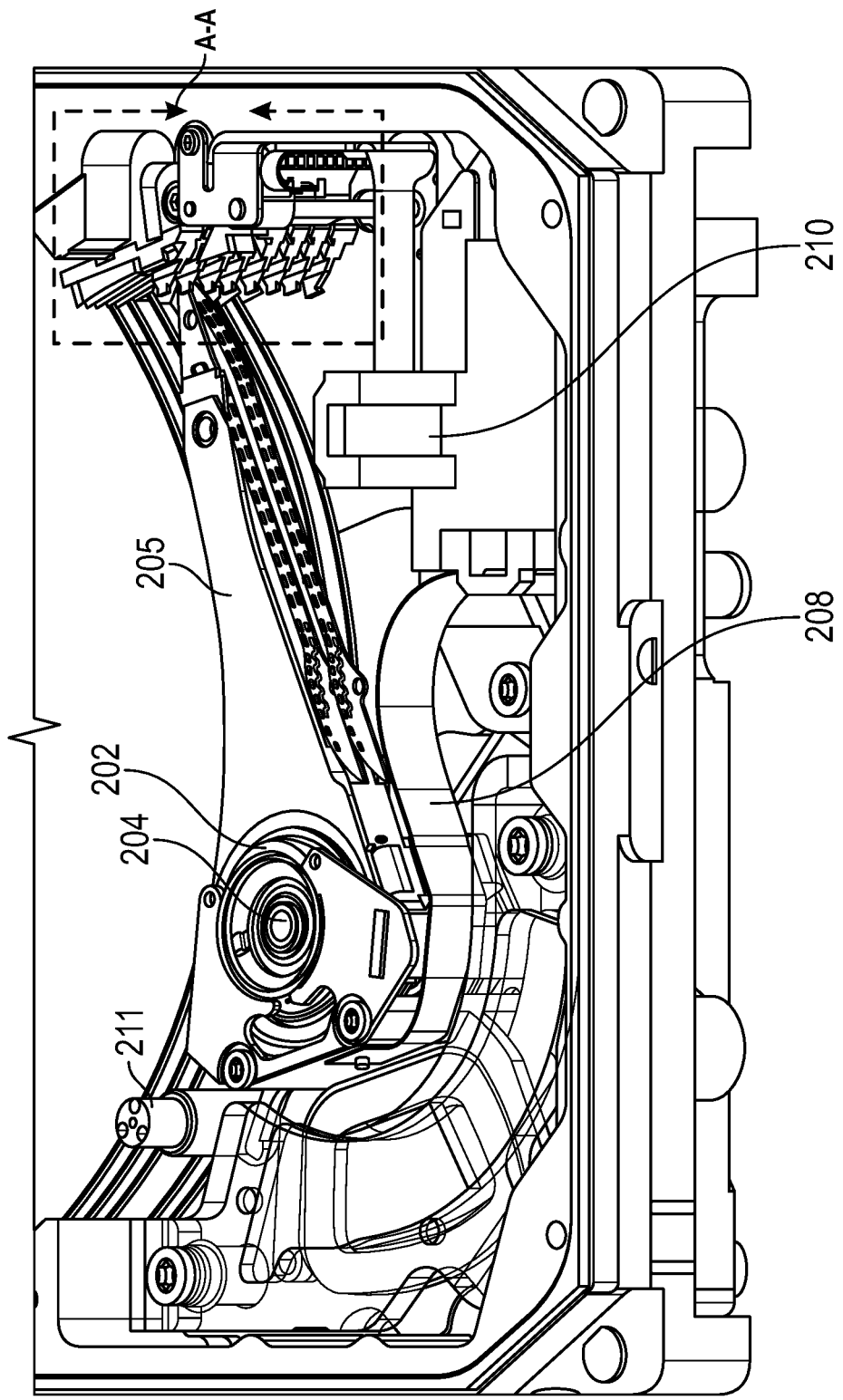
FIG. 2A is a perspective view illustrating an actuator subsystem in a reduced-head hard disk drive, according to an embodiment.
Figure 2B:
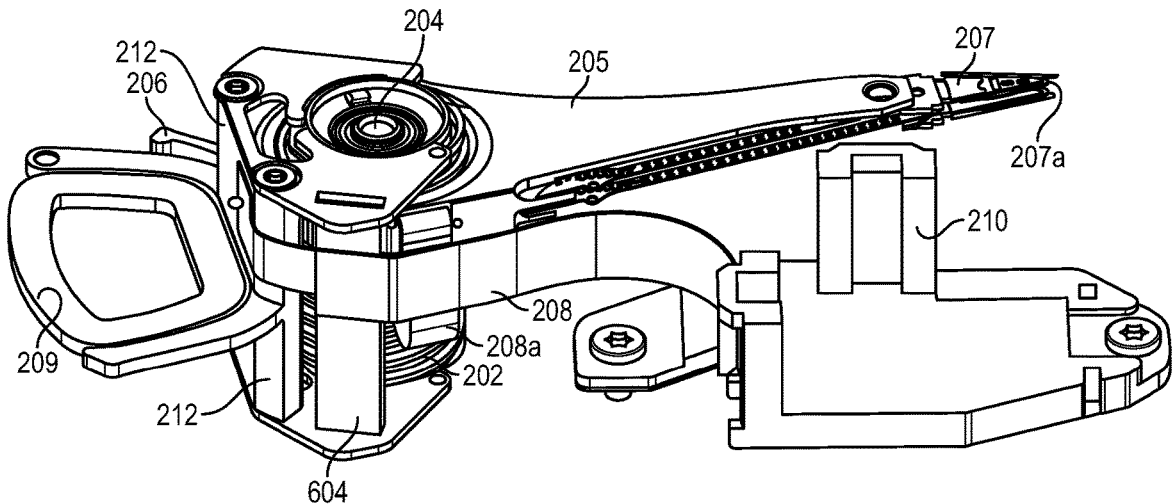
FIG. 2B is an isolated perspective view illustrating the actuator subsystem of FIG. 2A, according to an embodiment.
Figure 2C:
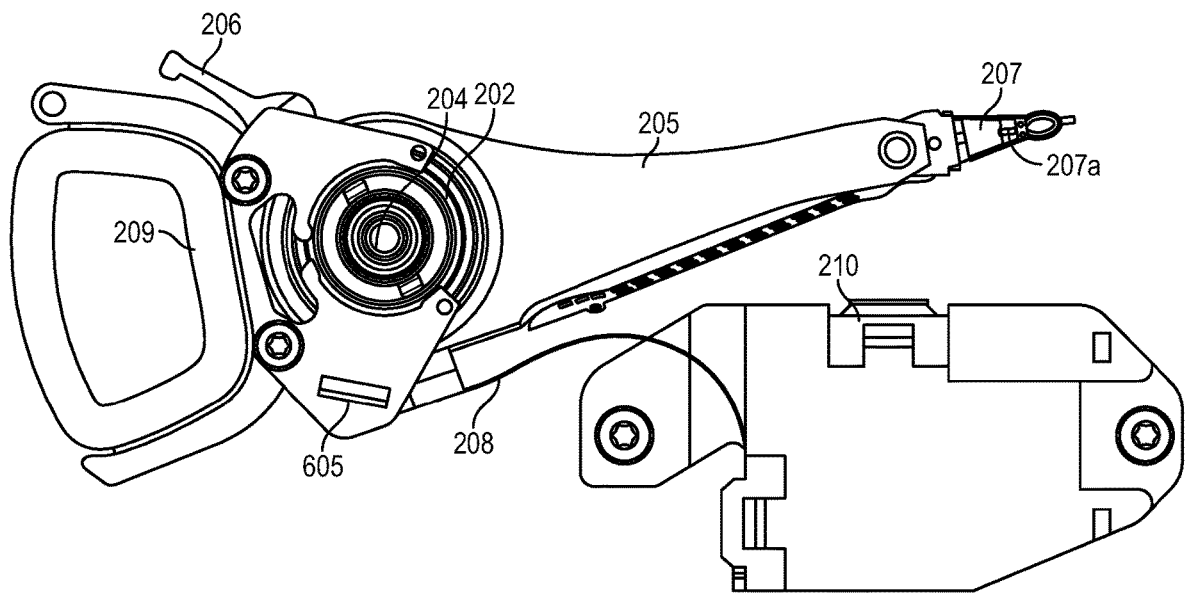
FIG. 2C is an isolated plan view illustrating the actuator subsystem of FIG. 2A, according to an embodiment.

FIG. 2A is a perspective view illustrating an actuator subsystem in a reduced-head hard disk drive (HDD), FIG. 2B is an isolated perspective view illustrating the actuator subsystem of FIG. 2A, and FIG. 2C is an isolated plan view illustrating the actuator subsystem of FIG. 2A, all according to embodiments. FIGS. 2A-2C collectively illustrate an actuator subsystem comprising a low profile ball screw cam assembly 202 (or "cam 202"), which transforms rotary motion into linear motion, with a stepper motor 204 (or "stepping motor") disposed therein to form an actuator elevator subassembly, which is disposed within the actuator pivot and pivot bearing of the actuator subsystem (e.g., the "pivot cartridge") and is configured to vertically translate at least one actuator arm 205 (see, e.g., arm 132 of FIG. 1) along with a respective HGA 207 (see, e.g., HGA 110 of FIG. 1). According to an embodiment, the actuator subsystem for a reduced-head HDD consists of two actuator arm 205 assemblies each with a corresponding HGA 207 (e.g., a modified HSA, in which the actuator arm assemblies translate vertically, or elevate, while the VCM coil 209 may be fixed in the vertical direction) housing a corresponding read-write head 207a (see, e.g., read-write head 110a of FIG. 1). Generally, the term "reduced-head HDD" is used to refer to an HDD in which the number of read-write heads is less than the number of magnetic-recording disk media surfaces.

With respect to electrical signal transmission, FIGS. 2A-2C further illustrate a flexible cable assembly 208 ("FCA 208"), which is configured to comprise a dynamic vertical "loop" 208a ("FCA vertical loop 208a") for vertical translation of the end(s) that are coupled to the actuator elevator subassembly and/or another portion of the actuator subsystem. This FCA vertical loop 208a is in addition to a typical dynamic horizontal loop for horizontal translation purposes for when the actuator to which one end is connected is rotating. The actuator subsystem further comprises at least one connector housing 210 for housing an electrical connector for transferring electrical signals (e.g., motor power, sensor signals, etc.) between the actuator elevator subassembly and a ramp elevator assembly (described in more detail elsewhere herein).

With respect to actuator arm locking, FIGS. 2A-2C further illustrate an arm lock subsystem 206, coupled with or constituent to a coil support assembly 212, configured to mechanically interact with an outer diameter crash stop 211 ("ODCS 211") to lock and unlock the actuator elevator subassembly, as described in more detail elsewhere herein.

Actuator Elevator Assembly

Figure 3:
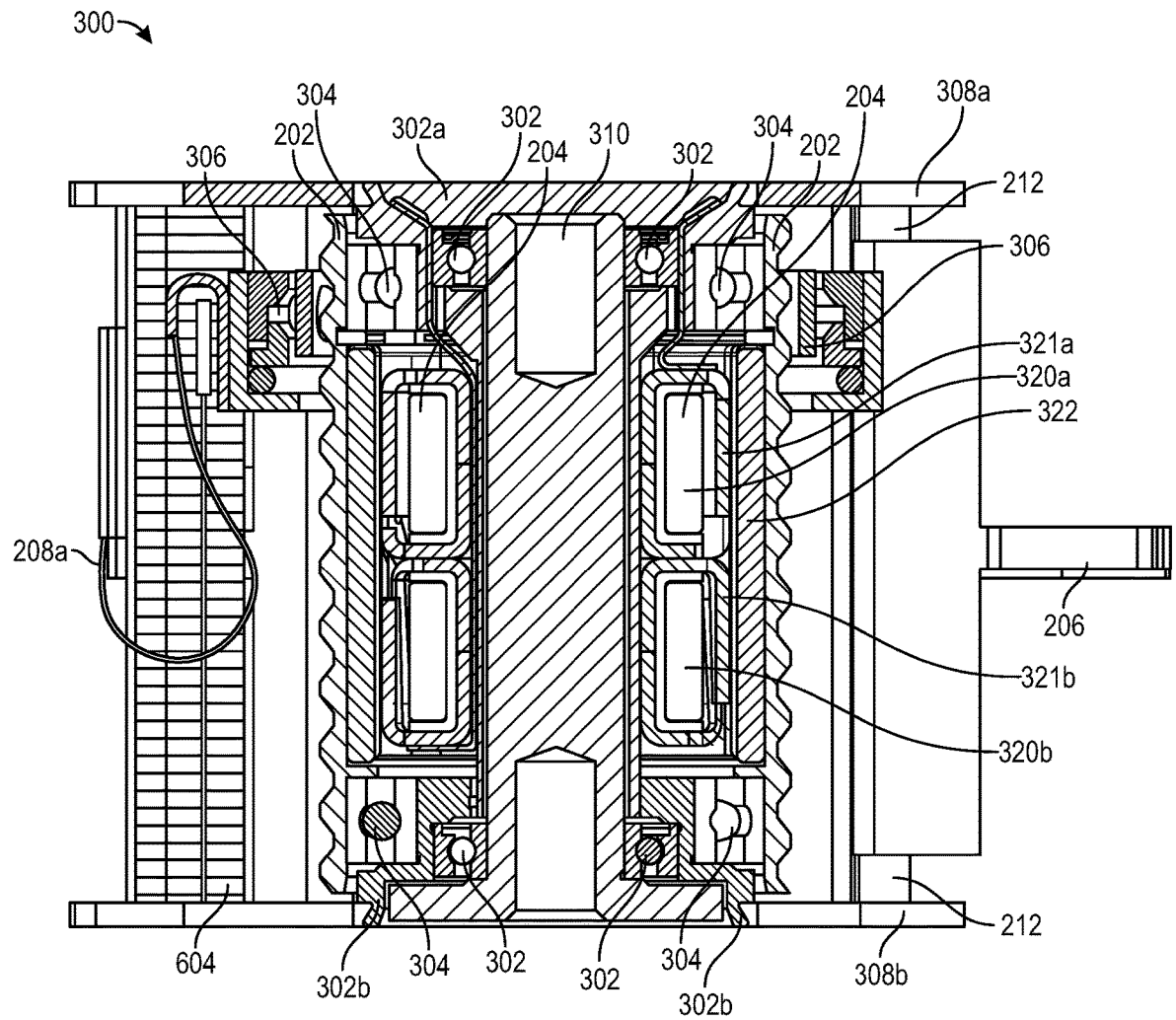
FIG. 3 is a cross-sectional side view illustrating an actuator elevator assembly, according to an embodiment.

FIG. 3 is a cross-sectional side view illustrating an actuator elevator assembly, according to an embodiment. The actuator elevator assembly 300 illustrated in FIG. 3 is configured for use in an actuator subsystem as illustrated and described in reference to FIGS. 2A-2C, i.e., configured to vertically translate at least one actuator arm 205 (shown here is a portion of the arm 205 that engages with the pivot; see, e.g., FIGS. 2A-2C, 4A-4C) with a respective HGA 207 (FIGS. 2B, 2C) and read-write head 207a (FIGS. 2B, 2C).

Actuator elevator assembly 300 comprises the actuator elevator subassembly comprising the ball screw cam 202, having the stepper motor 204 coupled to (e.g., with an outer sleeve adhered to the inner surface of the cam 202) and disposed therein and interposed between the cam 202 and a pivot shaft 310, where the pivot shaft 310 bottom is shown positioned within an opening of a bottom support plate 308b and the pivot shaft 310 top is shown positioned approaching or within an opening of a top support plate 308a. In a typical HDD configuration, the inner pivot shaft 310 is further coupled to an HDD enclosure base (see, e.g., housing 168 of FIG. 1) via a screw or other fastener and to an HDD cover (not shown) via another screw or fastener, effectively sandwiching the pivot shaft 310 and the actuator elevator assembly 300 more broadly within the corresponding HDD.

Actuator elevator assembly 300 further comprises a first set or pair of HSA pivot bearings 302 (along with upper inner bearing housing 302a and lower inner bearing housing 302b) interposed between the pivot shaft 310 and the stepper motor 204 (e.g., one bearing assembly near the top and one bearing assembly near the bottom). HSA pivot bearings 302 function to support loads associated at least in part with the rotation of the actuator arms 205 (FIGS. 2A-2C), along with the stepper motor 204 and the cam 202 to which it is attached, about the stationary pivot shaft 310, such as during actuator seek/read/write/load/unload operations. Actuator elevator assembly 300 further comprises a second set or pair of cam bearings 304 interposed between the stepper motor 204 and the cam 202 (e.g., one bearing assembly near the top and one bearing assembly near the bottom). Cam bearings 304 function to support loads associated at least in part with the rotation of the stepper motor 204 and the cam 202 about the stationary pivot shaft 310 (when the actuator elevator subassembly is decoupled from the HSA pivot inner bearing housing 302a, 302b, as described in more detail elsewhere herein with respect to the operation of the arm lock subsystem 206), such as during actuator vertical translation operations.

Actuator elevator assembly 300 further comprises a third set of ball screw bearings comprising balls 202c and retainer 202b interposed between a cam screw 202a (see, e.g., FIGS. 4A-4C) and the actuator arm 205. This ball screw bearing assembly functions to support loads associated at least in part with the rotation of the stepper motor 204 and the cam 202 about the stationary pivot shaft 310 and the consequent actuator vertical translation operations.

Low Profile Ball Screw Cam

According to an embodiment, one approach to an actuator elevator mechanism for a cold storage HDD uses a multi-start threaded shaft (also referred to as a "multi-start ball screw") with a ball in each start to create a plane perpendicular to the screw/cam. The balls are held equally spaced around the shaft by a bearing retainer. The balls are preloaded to the shaft at all times by compressing the two outer races. This platform is stable and does not rattle or function loosely, thus providing consistent structural integrity.

Figure 4A:
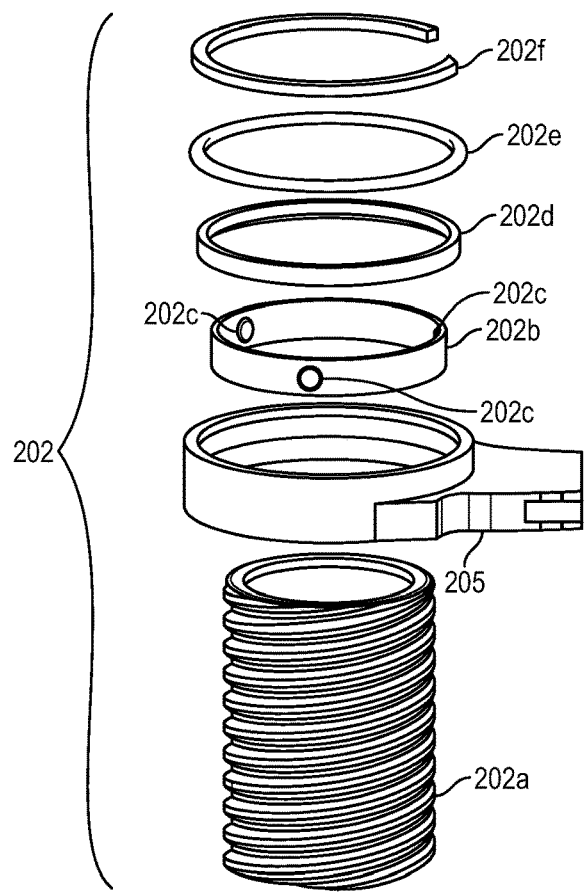
FIG. 4A is an exploded view illustrating a low-profile ball screw cam assembly, according to an embodiment.
Figure 4B:
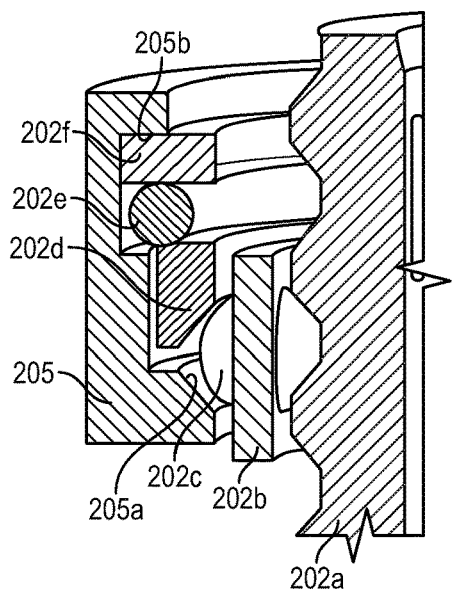
FIG. 4B is a partial cross-sectional view illustrating a portion of the cam assembly of FIG. 4A, according to an embodiment.

FIG. 4A is an exploded view illustrating a low-profile ball screw cam assembly, and FIG. 4B is a partial cross-sectional view illustrating a portion of the cam assembly of FIG. 4A, according to an embodiment. The illustrated ball screw cam assembly referred to as cam 202 comprises the hollow threaded shaft or screw 202a, a bearing retainer 202b or retaining ring with a plurality of equally-spaced retained balls 202c, a bearing half-race 202d, an O-ring 202e, and, optionally, a C-clip 202f, according to an embodiment. Cam 202 is configured for use in the actuator elevator assembly 300 illustrated in FIG. 3, which is configured for use in the actuator subsystem illustrated and described in reference to FIGS. 2A-2C, i.e., to vertically translate at least one actuator arm 205 with a respective HGA 207 and read-write head 207a. However, use of a cam mechanism such as cam 202 in implementations outside of such an actuator subsystem (e.g., in a camera, or in other products requiring a miniature cam/translation mechanism) is contemplated, so the use scenarios for cam 202 are not limited to implementations only within such an actuator subsystem.

It is noteworthy that with cam 202, according to an embodiment, the number of starts equals the number of balls, thereby providing a stable planar "platform" with a single bearing assembly and perpendicular to the axis/translation path. According to an embodiment, three balls 202c are held within the bearing retainer 202b, thereby providing a 3-point planar bearing assembly while facilitating the low-profile aspect of the cam 202. While three balls are needed to define or construct the plane, the number of balls 202c may vary from implementation to implementation. While greater than three balls 202c provides a more stable planar platform (e.g., more contact points about the shaft provides more actuator arm stiffness and stability), a greater number of balls 202c would also increase the thread pitch and lead corresponding to the screw thread (especially in view of a stepper motor driver), perhaps undesirably in some use scenarios.

With reference to FIG. 4B, one can see that the tapered starts/threads of screw 202a function as upper and lower portions of an inner race of the bearing assembly of cam 202. According to an embodiment, the outer race of the bearing assembly of cam 202 is a split-race, i.e., a 2-part race (whereby the two outer load surfaces are split among two parts), comprising a tapered inner surface 205a of the opening in arm 205 as a lower outer race surface, and a tapered lower surface of bearing half-race 202d as an upper outer race surface, together forming what may be referred to as a v-notch outer race. The bearing assembly is therefore preloaded radially at four points of contact via the inner and outer races, while the O-ring 202e (e.g., elastomeric) functions as a spring to provide a variable compression force applied to the bearing half-race 202d, in conjunction with the C-clip 202f. Alternatively to use of an elastomeric O-ring 202e (e.g., which can degrade and cause creep over time), according to an embodiment a wavy washer, functioning as a metallic spring, may be implemented to provide the compression force to the outer race. Hence, this arrangement functions to manage or compensate for the possibility of slight changes in the diameter of the inner race/threads at various locations along the length of the screw 202a, such as those associated with part tolerances and manufacturing variability.

Figure 4C:
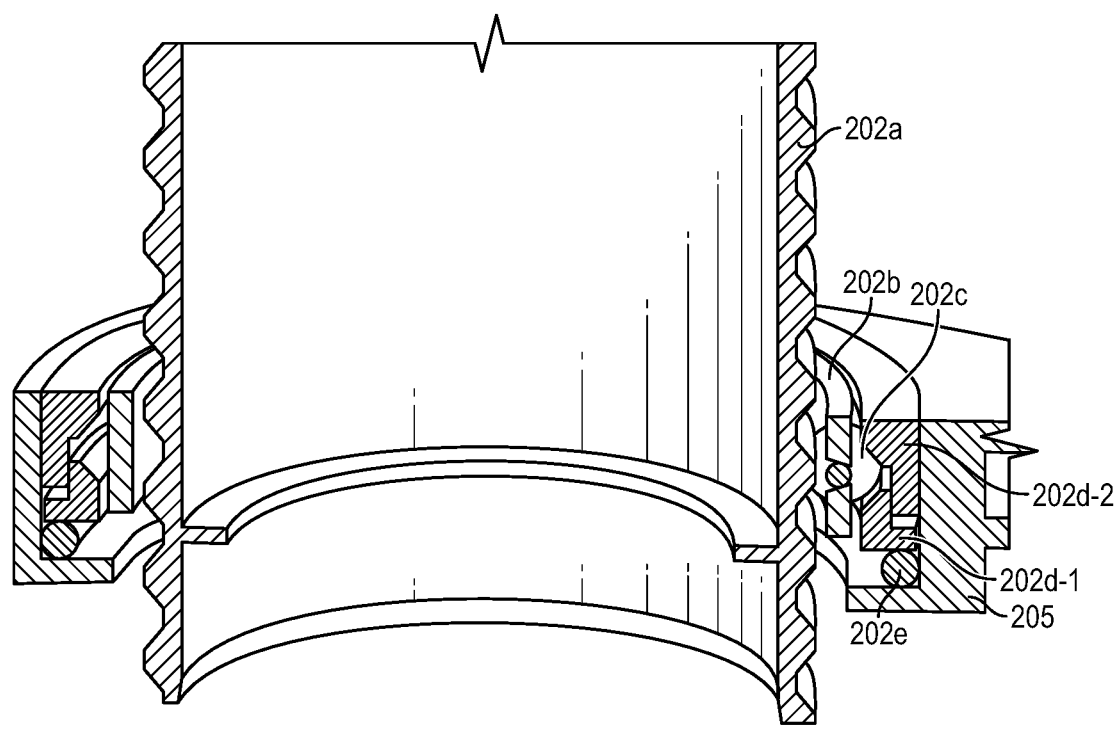
FIG. 4C is a partial cross-sectional view illustrating a portion of an alternative cam assembly, according to an embodiment.

Furthermore, one could eliminate use of the C-clip 202f and reconfigure the outer race, as illustrated in FIG. 4C. FIG. 4C is a partial cross-sectional view illustrating a portion of an alternative cam assembly, according to an embodiment. As with the embodiment illustrated in FIG. 4B, the tapered starts/threads of screw 202a function as upper and lower portions of an inner race of the bearing assembly of this embodiment of ball screw cam, cam 203. Here also the outer race of the bearing assembly of cam 203 is a split-race, or 2-part race, comprising a tapered half-race 202d-1 as a lower outer race surface and a tapered half-race 202d-2 as an upper outer race surface (bonded to an inner surface of the opening in arm 205 after preloading), together forming what may be referred to as a v-notch outer race. Here also the bearing assembly is therefore preloaded radially at four points of contact via the inner and outer races, while the O-ring 202e (or wavy washer) functions as a spring to provide a variable compression force applied to the bearing split-race comprising 202d-1, 201d-2.

In-Pivot Stepper Motor

In the context of a cold storage HDD that includes a rotary cam (e.g., cam 202) that is rotated with respect to the coil assembly (e.g., VCM coil 209), which would vertically move the actuator arms 205 up and down from disk to disk, a means to provide that rotation is needed. According to an embodiment and with reference to FIGS. 2A-3, a stepper motor 204 is assembled within the pivot (or, the pivot cartridge) of the actuator subsystem (FIGS. 2A-2C), which, in conjunction with the cam 202 (FIGS. 4A-4B), forms an actuator elevator assembly 300 (FIG. 3).

So-called "claw-pole" designs contain an inner permanent magnet (PM) mounted on a rotary lead-screw shaft. In the context of a multi-disk HDD having an actuator elevator mechanism, the actuator subsystem design comprises a stationary shaft during the translation of the head stack assembly (HSA) to switch between magnetic recording disks. With this, a unique design of a claw-pole stepper motor is needed. The smaller magnet volume of a typical claw-pole motor where the stator circumscribes the PM requires a high number of turns (100 or more) with a very small copper wire (e.g. 0.05 mm) due to the physical limitations. Because electromagnetic torque, $T_e=kD^2L$, is proportional to the square of the diameter of the magnetic air gap and the stator stack length, it is advantageous to maximize the motor diameter.

However, winding with a smaller wire diameter is difficult due to its fragility and is more susceptible to the fluctuation of the winding tension that causes wider distribution of the winding resistance. A high number of turns with a small diameter wire results in a higher copper loss, $P_{copper\ loss}=i^2R$, and subsequent heat that may adversely affect the internal environment of the HDD in terms of the dynamic read-write head gap due to potential ball-bearing oil migration. Thus, in the confined space of the cold storage data storage device rotary cam, it is preferable to implement a compact stepper motor to rotate the cam in order to move the HSA bi-directionally in the vertical direction to access different disks in the stack.

A claw-pole motor such as stepper motor 204 comprises, for example, two uni-filar windings in injection-molded-plastic spools for bipolar control and four claw-pole stators made from cold-rolled steel sheet metal, electrical steel sheet metal, SMC (Soft Magnetic Composite), and the like, where use of electrical steel with various levels of silicon content or SMC reduces the eddy current loss. Furthermore, use of SMC can produce a complex geometry through powder metallurgy, unlike stamped and formed electrical steel sheet. E ach stator contains p/2 teeth (p=number of poles) (e.g., 5 teeth per claw-pole stator according to an embodiment of stepper motor 204 having a 10-pole PM). The step angle of a stepper motor depends on the number of poles and stator teeth. In a design having 10 poles and 20 teeth, suitable for the intended purpose, the step angle/rotation is 18° or 20 steps/revolution in a full-step control, with both stator assemblies having a pair of claw-pole stators shifted relative to the other by one-half pole width, and where the step angle is inversely proportional to the number of stator teeth. Likewise, a design with 100 teeth yields 360°/100 or 3.6°/step angle, for example. In the case of 4 start-threaded rotary cam, this 3.6° step angle would provide 4 mm/100 steps or 0.04 mm step resolution rather than 4 mm/20 steps or 0.2 mm step resolution, thus providing a more precise and accurate servo control for positioning the HSA between the disks. Stated otherwise, a higher number of the claw (stator) teeth provides for a smaller step resolution. However, the outer diameter (OD) of the system (e.g., cam 202) limits the possible number of claw teeth. That is, with a given OD there is a practical limit to the number of teeth implemented because adding more teeth reduces their size and leads to manufacturing difficulty, magnetic saturation, and unstable tooth structures. For example, with an 18 mm OD, the system could be limited to 40 teeth and a step angle of 360°/40 or 9°. To get a higher step resolution, a micro-step may be used, where a typical bi-polar driver provides ½, ¼, ⅛, 1/16, and 1/32 micro-steps.

A corresponding rotor of stepper motor 204 comprises a PM (e.g. Nd—Fe—B) attached to the inner diameter of the cam 202 (see, e.g., FIG. 3), which, according to an embodiment, is constructed of ferritic stainless steel, and where the PM comprises 10 hetero-polar magnets. Hence, when the coils are energized the teeth become north and south poles, and mutual torque is established when the north PM poles align with the south claw poles and the south PM poles align with the north claw poles. Reversing the current polarity in the stator coils reverses the polarity of the electromagnetic claw poles and the resultant torque advances the rotor one full step.

Note that the number of coils and corresponding claw-pole stator pairs (i.e., phases), and the number of corresponding teeth on each claw-pole stator, may vary from implementation to implementation based on specific design goals (e.g., torque, phases and rotational degrees/step or steps/revolution) and, therefore, are not limited by the number described in the foregoing example. For example, with a 2-inch form-factor HDD, a four-coil design is feasible, which equates to 9° step angle, i.e., 360°/(number of teeth per claw)*(number of claws)=360°/(5*8)=9°/step. Alternatively, the step angle can be computed from the corresponding number of rotor poles and phases, i.e., 360°/(2 phases*20 rotor poles)=9°/step.

With reference back to FIG. 3, stepper motor 204 comprises a circular "phase A" coil 320a (with or without corresponding bobbin) enveloped by a pair of corresponding circular and mating claw-poles stators 321a, a circular "phase B" coil 320b (with or without corresponding bobbin) enveloped by a pair of corresponding circular and mating claw-pole stators 321b, disposed within a circular permanent magnet 322 ("PM 322"), all positioned around the stationary shaft 310. Note that when the HSA moves (e.g., actuator arm 205 seeks), the cam 202 and the HSA pivot bearing 302 upper and lower housing 302a, 302b move synchronously and thus eliminate the differential reluctance or cogging torque that must be overcome in the rotary motion of the HSA.

According to an embodiment, it is noteworthy that in-pivot stepper motor 204 is configured with an outer rotor and inner stators. That is, in contrast with typical stepper motors, here the PM 322 is on the outside of the stepper motor 204 assembly and the claw-poles 321a, 321b and coils 320a, 320b are on the inside of the PM 322. Likewise, while a conventional stepper motor typically rotates a central shaft, here the shaft 310 is fixed/stationary and the PM 322 rotor is bonded to the inner diameter of the cam shaft or screw 202a such that the stepper motor 204 rotates the outer cam 202 about the fixed inner shaft 310. In that sense, this embodiment of stepper motor 204 is akin to a conventional stepper motor that is "turned inside-out".

Method of Assembling an Actuator Elevator Subassembly

A method of assembling an actuator elevator subassembly, according to an embodiment, is as follows. The described method may be used to assemble an assembly comprising the cam 202 and a 10-pole stepper motor such as in-pivot stepper motor 204, for example. However, as described elsewhere herein, the number of poles may vary from implementation to implementation and therefore, is not so limited.

First, insert the upper HSA pivot bearing 302 into the upper inner bearing housing 302a and bond (e.g., glue) the outer race of the upper HSA pivot bearing 302 to the upper inner bearing housing 302a. Next, insert the upper cam bearing 304 around the inner bearing housing 302a and bond the inner race of the upper cam bearing 304 to the upper inner bearing housing 302a. Once these bearings 302, 304 are assembled, the method moves on to the stepper motor 204, as follows.

Insert around, orient, and bond a claw-pole stator 321a (a first half of a first pair) to an outer sleeve portion of the upper inner bearing housing 302a. Next, insert within and bond a first coil 320a to the first claw-pole stator 321a of the first pair. Next, rotate a claw-pole stator 321a (the second half of the first pair) 36° relative to the first claw-pole stator 321a of the first pair and bond the second half of the claw-pole stator 321a to the outer sleeve portion of the upper inner bearing housing 302a. Next, rotate a claw-pole stator 321b (a first half of a second pair) 18° relative to the second claw-pole stator 321a of the first pair and bond the first half of the claw-pole stator 321b of the second pair to the outer sleeve portion of the upper inner bearing housing 302a. Next, insert around and bond a second coil 320b to the upper inner bearing housing 302a. Next, rotate a claw-pole stator 321b (the second half of the second pair) 36° relative to the first claw-pole stator 321b of the second pair and bond the second half of the claw-pole stator 321b to the outer sleeve portion of the upper inner bearing housing 302a. Insert a magnetized PM 322 (magnetized to produce 10 pole, or 5 pole-pairs) and bond the outer diameter surface of the PM 322 to in the inner diameter surface of the screw 202a. Once the stepper motor is assembled as above, the method moves on to the lower bearings, as follows.

Insert the lower HSA pivot bearing 302 into the lower inner bearing housing 302b and bond the outer race of the lower HSA pivot bearing 302 to the lower inner bearing housing 302b. Next, insert the lower cam bearing 304 around the lower inner bearing housing 302b and bond the inner race of the lower cam bearing 304 to the lower inner bearing housing 302b. Next, bond the outer race of the lower cam bearing 304, now in assembly form with the lower HSA pivot bearing 302 and the lower inner bearing housing 302b, into the screw 202a subassembly. Next, apply bonding adhesive completely around the outer diameter periphery of the upper inner bearing housing 302a, and apply bonding adhesive to the outer race of the upper cam bearing 304, and insert this subassembly into the screw 202a subassembly. Next, apply an adhesive bead to the lower inner bearing housing 302b and insert that lower bearing assembly into the screw 202a subassembly and the upper bearing subassembly. Finally, heat-cure the thermoset adhesive by placement of the assembly in an oven, for example.

Locking/Unlocking Mechanism for Vertically Translatable Actuator Assembly

Figure 5A:
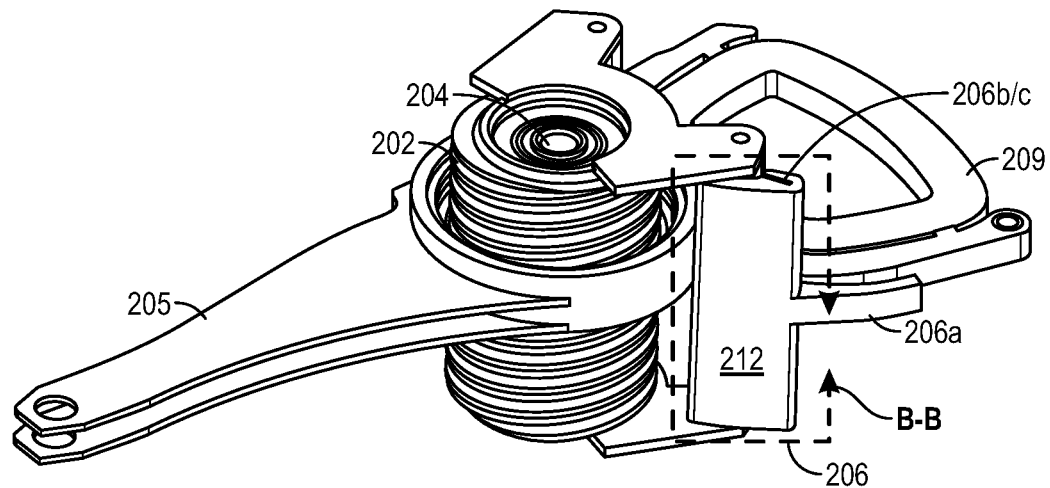
FIG. 5A is a perspective view illustrating an actuator-elevator assembly, according to an embodiment.
Figure 5B:
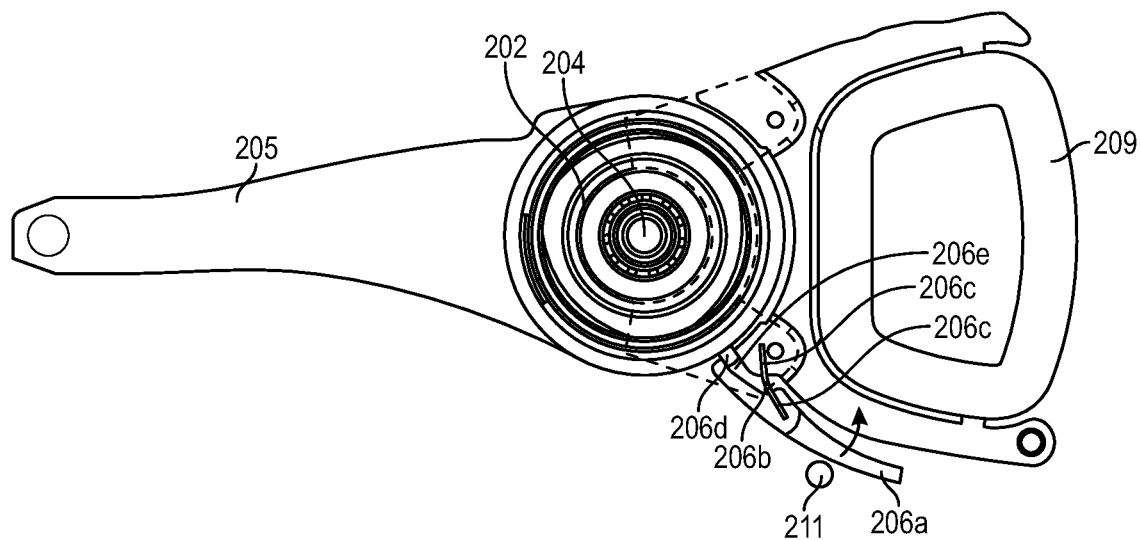
FIG. 5B is a plan view illustrating the actuator-elevator assembly of FIG. 5A, according to an embodiment.
Figure 5C:
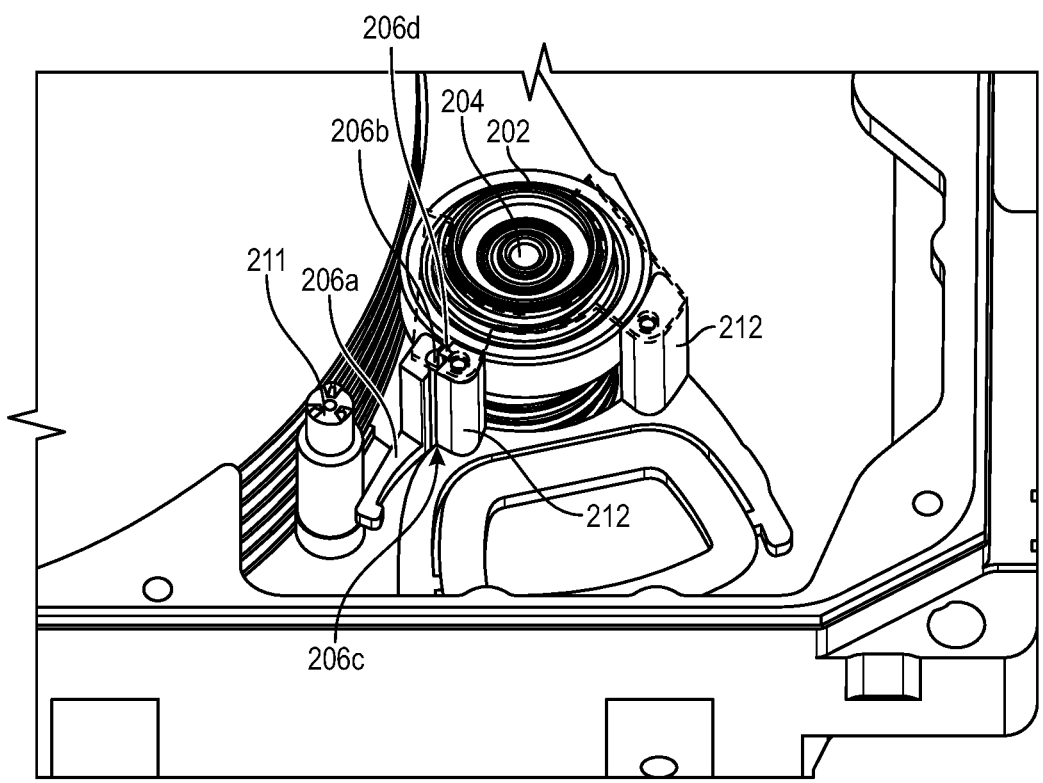
FIG. 5C is a perspective view illustrating the actuator-elevator assembly of FIG. 5A in a reduced-head data storage device, according to an embodiment.

FIG. 5A is a perspective view illustrating an actuator-elevator assembly, FIG. 5B is a plan view illustrating the actuator-elevator assembly of FIG. 5A, and FIG. 5C is a perspective view illustrating the actuator-elevator assembly of FIG. 5A in a reduced-head data storage device, all according to an embodiment. According to an embodiment and with reference to FIGS. 2A-4B, the locking/unlocking mechanism is constituent to the actuator subsystem (FIGS. 2A-2C) and which operates to vertically lock the actuator arm in place during seek/read/write operations, for example, and to unlock the actuator arm for vertical translation under the control of the cam 202 (FIGS. 4A-4B) and the stepper motor 204 (FIGS. 2A-3) constituent to the actuator elevator assembly 300 (FIG. 3).

FIGS. 5A-5C collectively illustrate a locking/unlocking mechanism previously-introduced as arm lock subsystem 206 (hereinafter, "locking mechanism 206"), located in the general area labeled as B-B in FIG. 5A. Locking mechanism 206 comprises a tab 206d extending from actuator arm 205 into a slot 206e within the structure of coil support assembly 212, whereby the tab 206d is squeezed, held, locked within the slot 206e when in a cam locked position and is released, unlocked from the compression of the slot 206e and therefore free to travel in the vertical direction when in a cam unlocked position. According to an embodiment, the tab 206d and/or the clamping surfaces of the slot 206e are coated with a low-wear, high-coefficient of friction material to provide for strong clamping while inhibiting the undesirable particle generation within the drive. Locking mechanism 206 further comprises a spring mechanism 206b disposed within a slit 206c within the coil support assembly 212, wherein the slit 206c intersects the slot 206e. According to an embodiment, the spring mechanism 206b is a sheet-like piece of material that is relatively thin, and long in the vertical direction in comparison with its width positioned coincident within the slit 206c. The spring mechanism 206b is rigid enough and configured/positioned within the slit 206c spanning across the slot 206e such that the force produced by the spring mechanism 206b, in a locked or default position (i.e., slightly bent along a vertical axis to elicit a spring-like force), compresses each side of the slot 206e toward each other to squeeze and hold the tab 206d in a fixed position within the slot 206e.

The cam is unlocked when the force associated with the spring mechanism 206b is overcome, thereby opening wider the slot 206e, such that the tab 206d is released from the hold of the slot 206e and thereby enabled to travel vertically within the slot 206e so that the actuator arm 205 from which the tab 206d extends can be vertically translated by the actuator elevator assembly 300. The force of spring mechanism 206b is overcome when a lock arm 206a, which is part of or constituent to the coil support assembly 212, and which is part of or extension of one side of the slot 206e, mechanically interacts with the previously-introduced ODCS 211, according to an embodiment. Alternatively, interaction with a mechanical element, feature, or structure other than a crash stop could be used to overcome the holding force of the spring mechanism 206b. As such, when the actuator arm 205 is driven/rotated far enough past the outer diameter of the disk stack, the lock arm 206a "crashes" into the ODCS 211, which causes the lock arm 206a to rotate (e.g., counter-clockwise) which then functions to open the gap corresponding to slot 206e (e.g., similarly to how a clothes-pin functions).

Flexible Cable Assembly with Vertical Loop

Figure 6A:
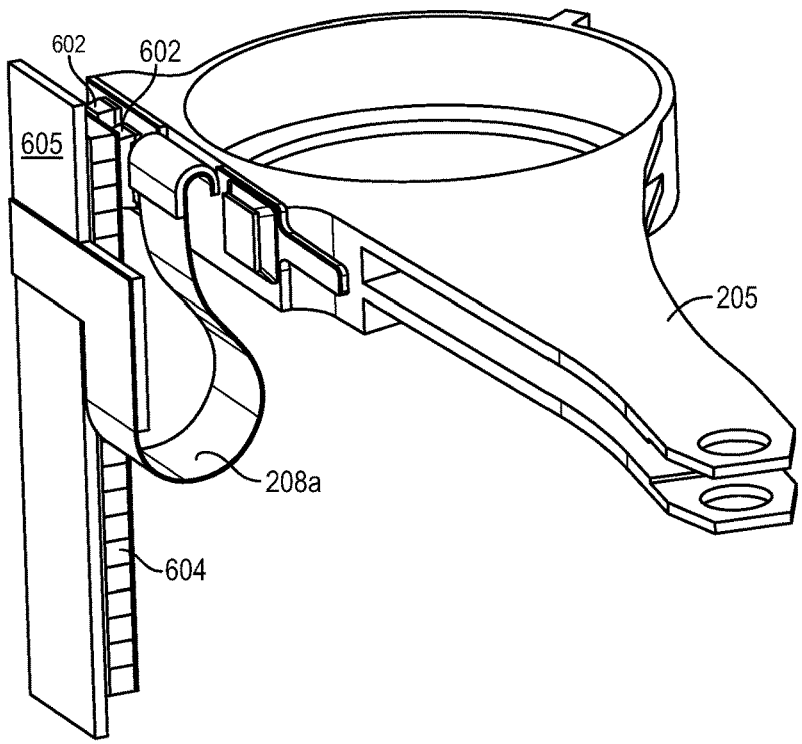
FIG. 6A is an isolated perspective view illustrating an actuator position sensor and flexible cable assembly, according to an embodiment.
Figure 6B:
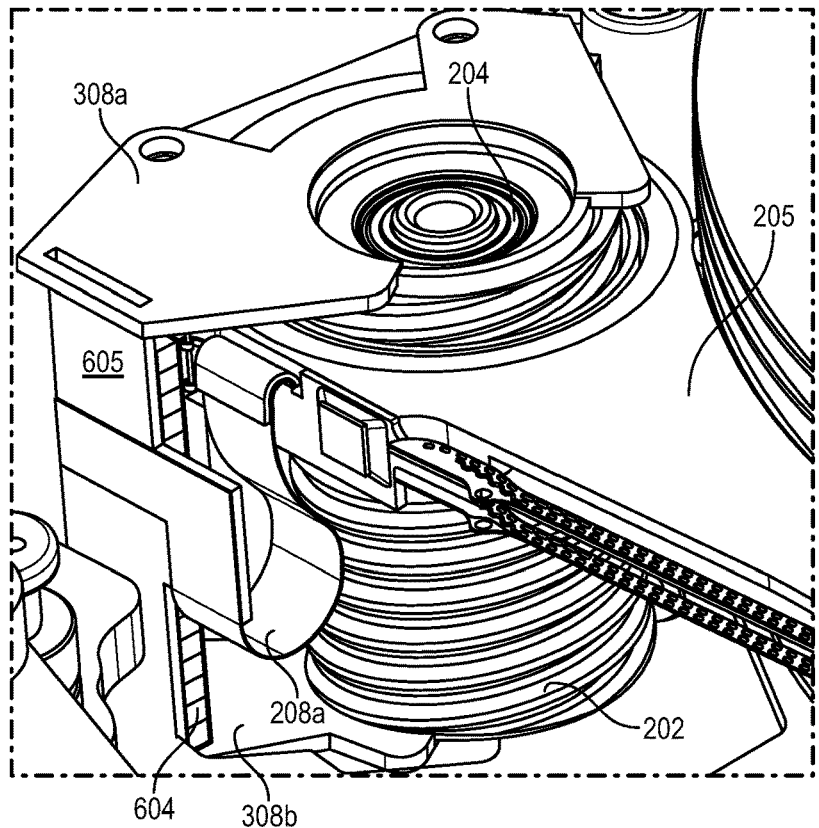
FIG. 6B is a perspective view illustrating the assembly of FIG. 6A assembled with the actuator elevator assembly of FIG. 3, according to an embodiment.

FIG. 6A is an isolated perspective view illustrating an actuator position sensor and flexible cable assembly, and FIG. 6B is a perspective view illustrating the assembly of FIG. 6A assembled with the actuator elevator assembly of FIG. 3, both according to an embodiment. According to an embodiment and with reference to FIGS. 2A-5C, the illustrated actuator position sensor and flexible cable assembly are constituent to the actuator subsystem (FIGS. 2A-2C), which provides for vertical translation of the actuator arm 205 under the control of the cam 202 (FIGS. 4A-4B) and the stepper motor 204 (FIGS. 2A-3) constituent to the actuator elevator assembly 300 (FIG. 3).

Conventional HDDs typically include a flexible cable assembly (FCA) such as FCA 156 of FIG. 1, which require some slack in the horizontal direction (e.g., XY direction) to allow for the distance between its connection points to vary in the horizontal direction in response to actuator rotation, as one connection point is with part of the actuator arm. However, an FCA cable for a rotating and vertically translating actuator connects to an actuator that not only moves in the XY plane for seeking data on the disk, but also moves in the Z direction to move among the disks in the multi-disk stack. Thus, a complete flex may be designed as either a one part solution or designed as two different parts combined together, with the use of a connector to carry electrical signals. With an actuator that is configured to move vertically, such as in the context of the actuator subsystem described in reference to of FIGS. 2A-5C, according to an embodiment the FCA 208 (see, e.g., FIGS. 2A-2C, not shown here), which moves in the XY direction such as during seeking, further comprises or is electronically coupled or spliced with a dynamic vertical loop portion of FCA, referred to as FCA vertical loop 208a, which moves effectively independently of the FCA 208 portion such as when the actuator is vertically translating. Functionally similar to the FCA 156, the FCA vertical loop 208a provides some slack in the Z direction to allow for the distance between its connection points to vary in the vertical direction in response to actuator vertical translation, as one connection point is with part of the actuator arm 205. Both the horizontal loop of FCA 208 and the FCA vertical loop 208a are configured to move independently of the other.

Note that the configuration and shape of the FCA vertical loop 208a may vary from implementation to implementation. According to an embodiment, a "U-loop" configuration is implemented for FCA vertical loop 208a (the loop generally resembles a letter "U" in various not-fully-extended states), as depicted in FIGS. 6A-6B. However, other shaped vertical loops may be designed and implemented for use in this context, such as a C-loop shape that resembles the letter "C" when not fully extended and an S-loop shape that resembles the letter "S" when not fully extended, and the like. In the configuration depicted, the FCA vertical loop 208a is positioned near a preamp 606 and whereby the XY loop of FCA 208 electrically connects the FCA vertical loop 208a to a bracket and/or a connector housing 210 (see, e.g., FIGS. 2A-2C).

Further illustrated in FIGS. 6A-6B is a pair of proximity or position sensors 602 coupled to the actuator arm 205 and configured to sense the Z position of the actuator arm 205 (e.g., vertical height) relative to a magnetic encoding strip and, ultimately, relative to the disk stack. According to an embodiment, one or more Hall effect sensors mounted in a quadrature configuration are implemented for the position sensor(s) 602, which function in coordination with a closely-positioned magnetic encoder strip 604, mounted on a stiffener 605, to provide sine and cosine signals for sensing the directions and crossing of the waveforms. The stiffener 605 may further function for positioning of the FCA 208 and FCA vertical loop 208a.

Generally, magnetic flux density in the air gap between the Hall sensors and the permanent magnet scale (i.e., magnetic encoding strip 604) should be set at an optimum gap range to provide adequate signal strength. A narrow gap causes signal saturation and a wide gap weakens the signal. In either case, detection of the zero-crossing points is uncertain. However, the quadrature configuration of the Hall sensors in conjunction with a 1 mm pole-pitch magnetic scale provides displacement and direction simultaneous by virtue of the leading and lagging nature of the waveforms in the upward and downward translations. For example, one Hall sensor signal leads when the stepper motor moves downward, and another Hall sensor signal leads when the stepper motor moves upward. A leading Hall sensor signal indicates the translational direction and the zero-crossing points of the sine-cosine waveforms provide the amount of the displacement.

Belt-Driven Rotary Cam Actuator Elevator Mechanism

In the context of a cold storage HDD that includes a rotary cam (e.g., cam 202 of FIGS. 2A-5C) that is rotated with respect to a coil assembly (e.g., VCM coil 209 of FIGS. 2B, 2C, 5A, 5B), which would vertically move a head-stack assembly (HSA) comprising one or more actuator arms (e.g., actuator arm 205 of FIGS. 2A-2C, 4A-4C, 5A, 5B) up and down from disk to disk, a means to provide that rotation is needed. According to an embodiment and with reference to FIGS. 7A and 7B, a belt-driven sub-system, in conjunction with the cam 202, forms an actuator elevator mechanism 700.

Figure 7A:
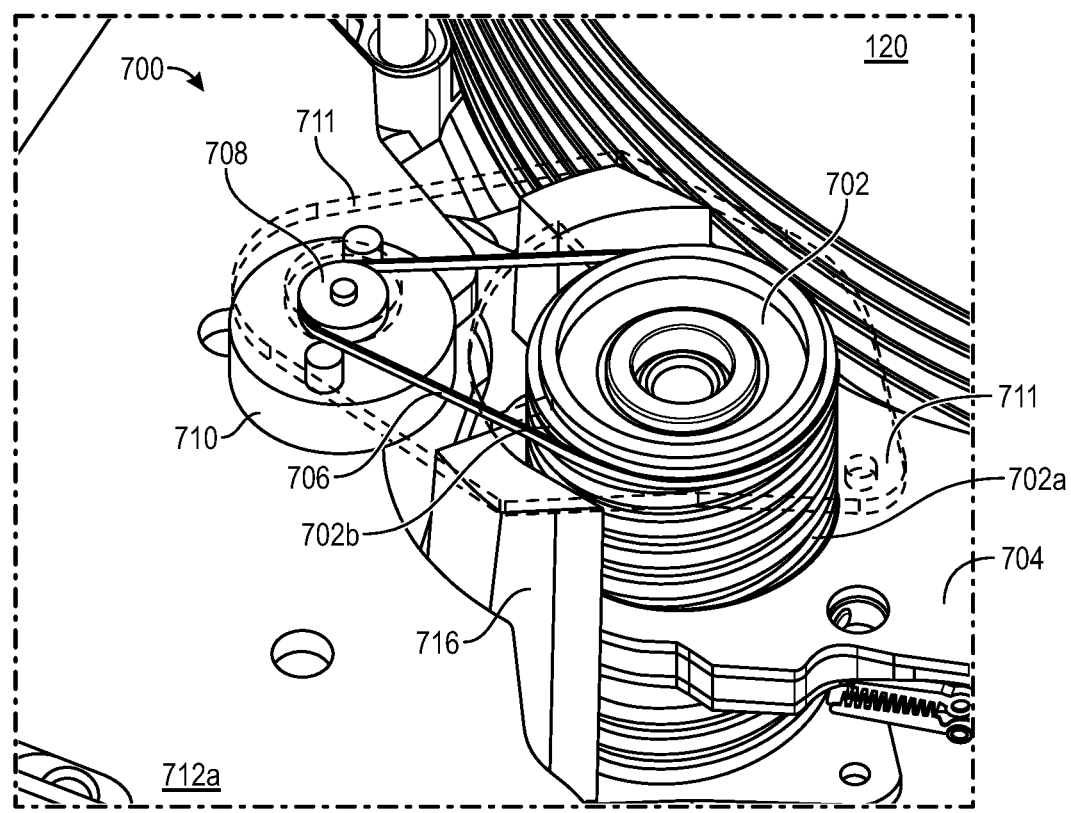
FIG. 7A is a perspective view illustrating a belt-driven actuator elevator mechanism, according to an embodiment.
Figure 7B:
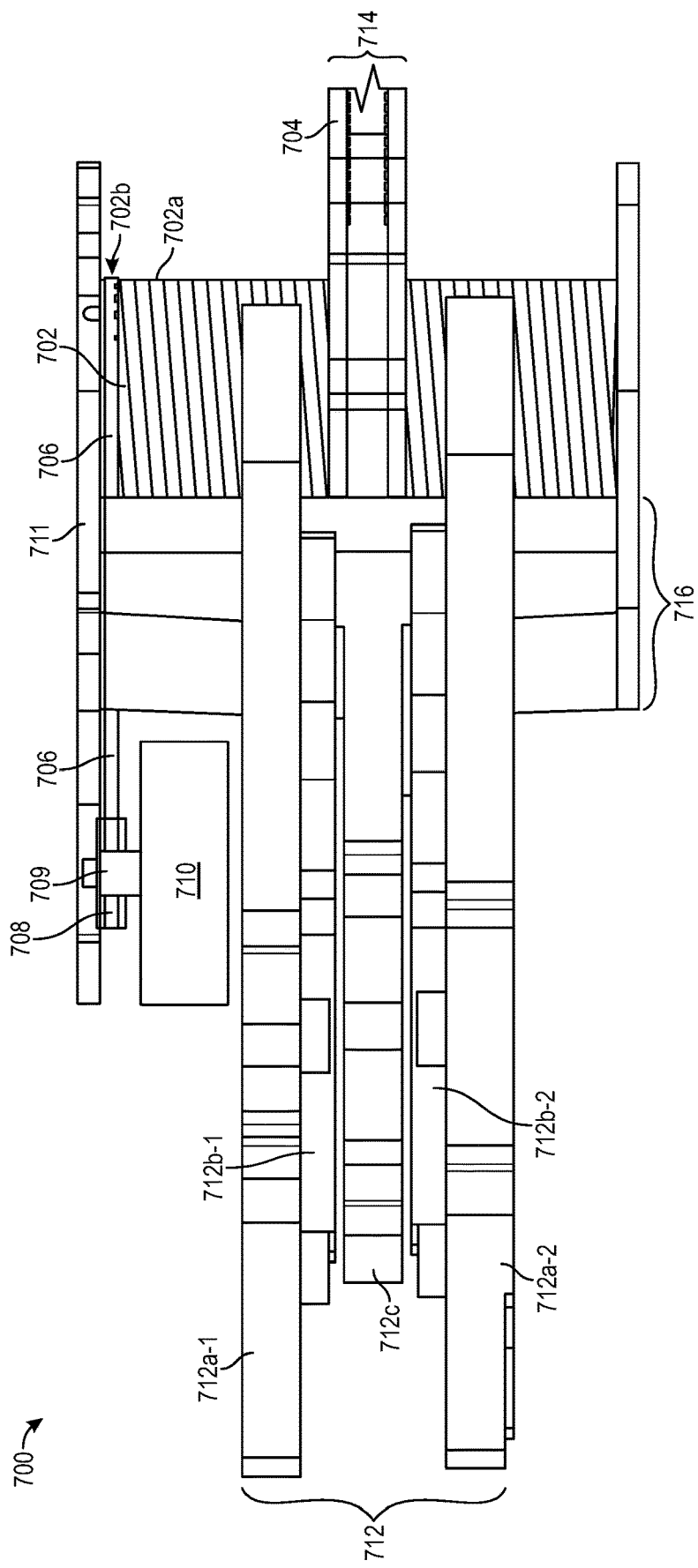
FIG. 7B is a side view illustrating the belt-driven actuator elevator mechanism of FIG. 7A, according to an embodiment.

FIG. 7A is a perspective view illustrating a belt-driven actuator elevator mechanism, and FIG. 7B is a side view illustrating the belt-driven actuator elevator mechanism of FIG. 7A, both according to embodiments. Actuator elevator mechanism 700 (or "actuator system 700", or "actuator assembly 700") comprises a cam assembly 702, a head-stack assembly (HSA) 704, a drive belt 706, a pulley 708, and a motor 710. While the elevator actuator mechanism is described primarily in terms of the use of a drive belt 706 and a pulley 708, according to an alternative implementation and embodiment, the drive belt 706 may be implemented as a drive chain and the pulley 708 may likewise be implemented as a drive gear to which the drive chain is engaged (e.g., chain links to gear teeth) or movably coupled and by way of which the drive chain is driven.

According to an embodiment, the cam assembly 702 is of a similar design as the cam 202 (see, e.g., FIGS. 2A-5C), however, without the in-pivot stepper motor 204 disposed therein. Here, according to an embodiment, a lead screw 702a (or "ball screw", e.g., similar to screw 202a of FIG. 4A) of the cam assembly 702 comprises a groove 702b encircling the lead screw 702a. As depicted and according to an embodiment, the groove 702b of the lead screw 702a is positioned near an end of the lead screw 702a (shown here near the top of the screw 702a). In the context of the elevator actuator mechanism being implemented as a drive chain and drive gear in place of the belt 706 and pulley 708, respectively, in such an embodiment the groove 702b of cam assembly may likewise be replaced with a driven gear.

The HSA 704 is coupled to the cam assembly 702 such that the HSA 704 is translatable (e.g., up and down, as shown) along at least most of the length of the cam assembly 702. HSA 704 may be of a similar configuration as described in reference to FIG. 1, e.g., an assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is operatively coupled (e.g., the actuator arm or comb being mechanically and fixedly coupled with the coil portion of the VCM). Generally, an HSA such as HSA 704 is the assembly configured to move the head slider to access portions of recording media (e.g., the recording medium 120) for read and write operations.

The drive mechanism for transmitting power and motion from the motor 710, e.g., a stepper motor according to an embodiment, to the cam assembly 702, for ultimately driving translation of the HSA 704 along the axis of the lead screw 702a of the cam assembly 702, is embodied in a drive belt sub-system. This sub-system comprises the drive belt 706 that is in part recessed in the groove 702b of the lead screw 702a, and the pulley 708 configured for driving the drive belt 706 under the control of and the driving force of the motor 710. Hence, the motor 710 is coupled with the pulley 708, and is configured to drive rotation of the pulley 708 to transmit power, motion, force, energy to the lead screw 702a of the cam assembly 702 by way of the drive belt 706, to drive the rotation of the lead screw 702a to drive the translation of the HSA 704 along the axis of the lead screw 702a. Regarding a stepper motor implementation of the motor 710, reference is made to the section herein entitled "In-Pivot Stepper Motor" for design and implementation considerations, which may apply similarly here in the context of a belt-driving/chain-driving stepper motor.

With reference to FIG. 7B, further details of HSA 704 are shown comprising the VCM actuator 712 to which actuator arms 714 (e.g., similar to arm 132 of FIG. 1) are operatively coupled (e.g., the actuator arm(s) 714 or comb being mechanically and fixedly coupled with a voice coil portion 712c of the VCM actuator 712). According to an embodiment, the VCM actuator 712 includes a pair of VCM plates 712a, i.e., an upper VCM plate 712a-1 and a lower VCM plate 712a-2, to which a respective magnet 712b-1, 712b-2 is coupled, and the voice coil 712c interposed therebetween. In the configuration depicted and according to an embodiment, the VCM actuator 712 is fixed by or to a VCM support structure 716 and, therefore, does not translate along the cam assembly 702 along with the HSA 704. Furthermore and according to an embodiment, the motor 710 is positioned or housed above the upper VCM plate 712a-1, a position which does not add additional complexity to the pivot assembly of the actuator system 700 and which provides more design freedom relating to the exact size and shape of the motor 710 itself, i.e., the motor is relatively unconstrained in the context of its design, position, configuration, and the like without interfering with other HDD sub-systems. However, the location and precise positioning of the motor 710 may vary from implementation to implementation based on, for example, the relevant design goals, spatial constraints, and the like. For example, the motor 710 can be positioned between the two VCM plates 712a-1 and 712a-2, below the lower VCM plate 712a-2, or elsewhere in the drive. According to an embodiment, the actuator system 700 further comprises a support plate 711 (shown in phantom form here for clarity of the underlying components) covering the cam assembly 702 and the drive belt 706, and the motor 710 is attached or otherwise coupled to and supported by the support plate 711.

Method for Translating a Head-Stack Assembly

Figure 8:
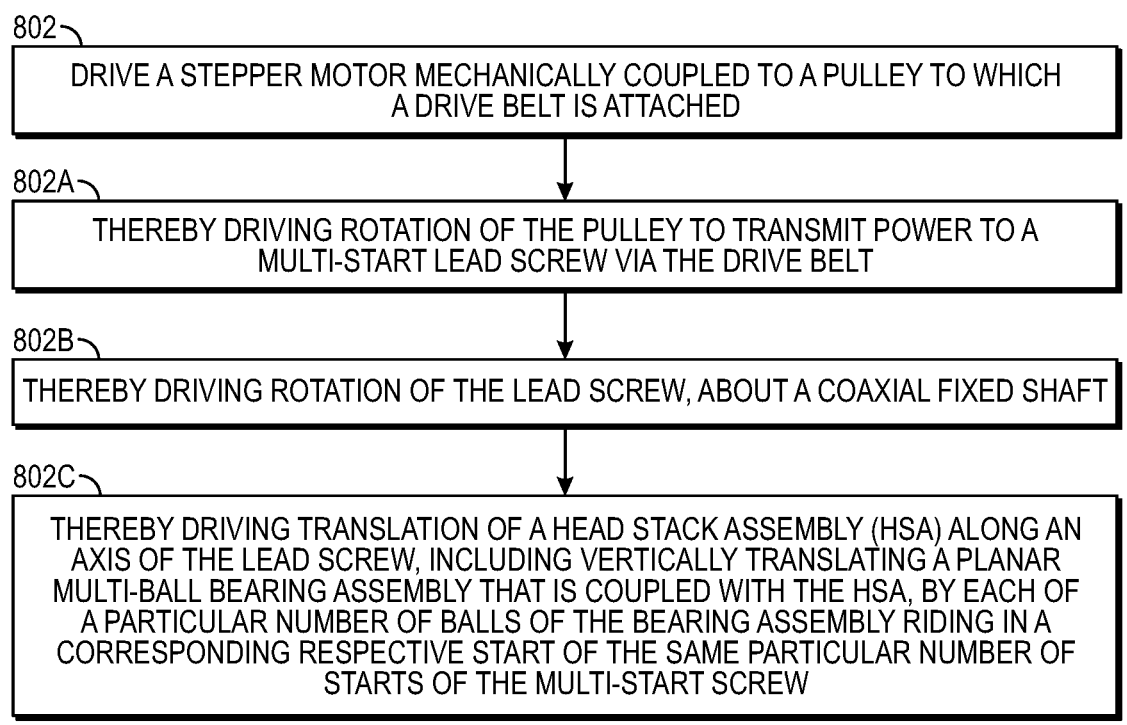
FIG. 8 is a flow diagram illustrating a method for translating a head-stack assembly in a hard disk drive to access multiple magnetic-recording disks, according to an embodiment.

FIG. 8 is a flow diagram illustrating a method for translating a head-stack assembly (HSA) in a hard disk drive (HDD) to access multiple magnetic-recording disks, according to an embodiment. FIG. 8 is described in further reference to components illustrated in FIGS. 7A, 7B. As discussed in reference to FIGS. 7A-7B, the drive belt 706 may be implemented as a drive chain and the pulley 708 may be implemented as a drive gear to which the drive chain is engaged or movably coupled and by way of which the drive chain is driven.

At block 802, drive a stepper motor mechanically coupled to a pulley (or drive gear) to which a drive belt (or drive chain) is attached. For example, stepper motor 710 (FIGS. 7A, 7B), which is operatively and mechanically coupled to pulley 708 (e.g., via drive shaft 709) to which drive belt 706 is attached, is driven, e.g., by applying electrical current to the stepper motor 710. At block 802a, driving the stepper motor at block 802 thereby drives rotation of the pulley (or drive gear) to transmit power to a multi-start lead screw via the drive belt (or drive chain). For example, driving the stepper motor 710 drives rotation of the pulley 708 to transmit power, energy, motion to a multi-start lead screw 702a of cam assembly 702 via the drive belt 706. At block 802b, driving the rotation of the pulley (or drive gear) at block 802a thereby drives rotation of the lead screw. For example, driving the rotation of the pulley 708 via the stepper motor 710 drives rotation of the lead screw 702a via the drive belt 706. According to an embodiment, the rotation of the lead screw is about a fixed shaft coaxial with the lead screw, such as with the rotation of the ball screw cam 202 (attached to the rotor of motor 204) about the fixed pivot shaft 310 (attached to the stator of motor 204), similarly to the configuration of actuator elevator assembly 300 of FIG. 3. At block 802c, driving the rotation of the lead screw at block 802b thereby drives translation of the HSA along the axis of the lead screw. For example, driving the rotation of the lead screw 702a via the drive belt 706 drives translation of the HSA 704 along the length of lead screw 702a. Thus, the read-write head(s) of the HSA is enabled to access and perform read operations and write operations on each respective magnetic recording disk (e.g., disk medium 120) of a multi-disk stack of a reduced-head HDD.

According to an embodiment, translation of the HSA includes translating (e.g., vertically) a multi-ball bearing assembly coupled with the HSA, by each of a particular number of balls of the bearing assembly riding in a corresponding respective start of the same particular number of starts of the multi-start screw. For example, translation of the HSA 704 includes translating (e.g., vertically) actuator arms 714 (e.g., similar to actuator arm 205 of FIG. 4A) coupled with the HSA 704, by each of a particular number of balls (e.g., similar to balls 202c of FIGS. 4A-4C) of the bearing assembly riding in a corresponding respective start or thread of the same particular number of starts of the multi-start screw 702a (e.g., similar to screw 202a of FIGS. 4A-4C). Thus, as described in reference to FIGS. 4A-4C, with the number of starts equaling the number of balls a stable planar "platform" is provided with a single bearing assembly perpendicular to the axis/translation path.

Extensions and Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A hard disk drive (HDD) comprising:
   a plurality of recording disk media rotatably mounted on a spindle;
   a plurality of head sliders fewer in number than the plurality of disk media, each comprising a read-write transducer configured to read from and to write to at least two disk media of the plurality of disk media;
   an actuator assembly configured to move the plurality of head sliders to access portions of the at least two disk media; and
   an actuator elevator mechanism comprising:
   a ball screw cam assembly comprising a screw and a driven feature,
   a head-stack assembly (HSA) translatably coupled with the cam assembly,
   a transmission element, operatively coupled with the driven feature and configured for transmitting power to the screw from a source positioned away from the screw,
   a driving element configured for driving the transmission element, and
   a motor coupled with the driving element and configured to drive rotation of the driving element to transmit power to the screw via the transmission element, to drive rotation of the screw to drive translation of the HSA along an axis of the screw.

2. The HDD of claim 1, wherein:
   the driven feature comprises a groove encircling the screw;
   the transmission element comprises a drive belt, in part recessed in the groove of the screw; and
   the driving element comprises a pulley configured for driving the drive belt.

3. The HDD of claim 1, wherein:
   the driven feature comprises a driven gear fixed to the screw;
   the transmission element comprises a drive chain engaged with the driven gear of the screw; and
   the driving element comprises a drive gear configured for driving the drive chain.

4. The HDD of claim 1, wherein the driven feature of the screw is positioned near an end of the screw.

5. The HDD of claim 1, wherein:
   the actuator assembly comprises a voice coil motor (VCM) comprising an upper VCM plate; and
   the motor of the actuator elevator mechanism is housed above the upper VCM plate.

6. The HDD of claim 5, wherein:
   the actuator elevator mechanism further comprises a support plate covering the cam assembly and the transmission element; and
   the motor of the actuator elevator mechanism is coupled to the support plate.

7. The HDD of claim 1, wherein the motor of the actuator elevator mechanism is a stepper motor.

8. The HDD of claim 1, wherein the ball screw cam assembly comprises:
   a hollow screw comprising at least three starts encircling the screw,
   a ball bearing assembly comprising a same number of balls as starts, wherein each ball rides in a corresponding start, thereby forming a plane on which the balls ride perpendicular to the axis of the screw.

9. An actuator system for a reduced-head hard disk drive (HDD), the system comprising:
   a ball screw cam assembly comprising a lead screw and a driven feature;
   a head-stack assembly (HSA) translatably coupled with the cam assembly;
   a transmission element, operatively coupled with the driven feature and configured for transmitting power to the lead screw from a source positioned away from the screw;
   a driving element configured for driving the transmission element;
   a drive shaft; and
   a motor coupled with the driving element via the drive shaft and configured to drive rotation of the driving element to transmit power to the lead screw via the transmission element and the driven feature, to drive rotation of the lead screw to drive translation of the HSA along an axis of the lead screw.

10. The actuator system of claim 9, wherein:
    the driven feature comprises a groove encircling the lead screw;
    the transmission element comprises a drive belt, in part recessed in the groove of the lead screw; and
    the driving element comprises a pulley configured for driving the drive belt.

11. The actuator system of claim 9, wherein:
    the driven feature comprises a driven gear fixed to the lead screw;
    the transmission element comprises a drive chain engaged with the driven gear of the lead screw; and
    the driving element comprises a drive gear configured for driving the drive chain.

12. The actuator system of claim 9, wherein the motor is a stepper motor.

13. The actuator system of claim 9, wherein:
    the lead screw comprises a hollow lead screw comprising at least three starts encircling the lead screw; and
    the ball screw cam assembly further comprises a ball bearing assembly comprising a same number of balls as starts, wherein each ball rides in a corresponding start, thereby forming a plane on which the balls ride perpendicular to the axis of the lead screw.

14. A hard disk drive comprising the actuator system of claim 9.

15. A method for translating a head-stack assembly (HSA) in a hard disk drive (HDD) to access multiple magnetic-recording disks, the method comprising:
    driving a stepper motor mechanically coupled to a driving element with which a transmission element is movably coupled, thereby driving rotation of the driving element to transmit power to a multi-start lead screw via the transmission element and a driven feature of the lead screw, thereby driving rotation of the lead screw about a coaxial fixed shaft thereby driving translation of the HSA along an axis of the lead screw.

16. The method of claim 15, wherein:

the driven feature comprises a groove encircling the lead screw;

the transmission element comprises a drive belt, in part recessed in the groove of the lead screw; and the driving element comprises a pulley configured for driving the drive belt.

17. The method of claim 15, wherein:

the driven feature comprises a driven gear fixed to the lead screw;

the transmission element comprises a drive chain engaged with the driven gear of the lead screw; and the driving element comprises a drive gear configured for driving the drive chain.

18. The method of claim 15, wherein driving the translation of the HSA includes vertically translating a planar multi-ball bearing assembly that is coupled with the HSA, by each of a particular number of balls of the bearing assembly riding in a corresponding respective start of the same particular number of starts of the multi-start screw.

\* \* \* \* \*